Nov. 13, 1923.
W. CAMBRIDGE
VEHICLE WHEEL
Filed Sept. 8, 1923
1,473,810
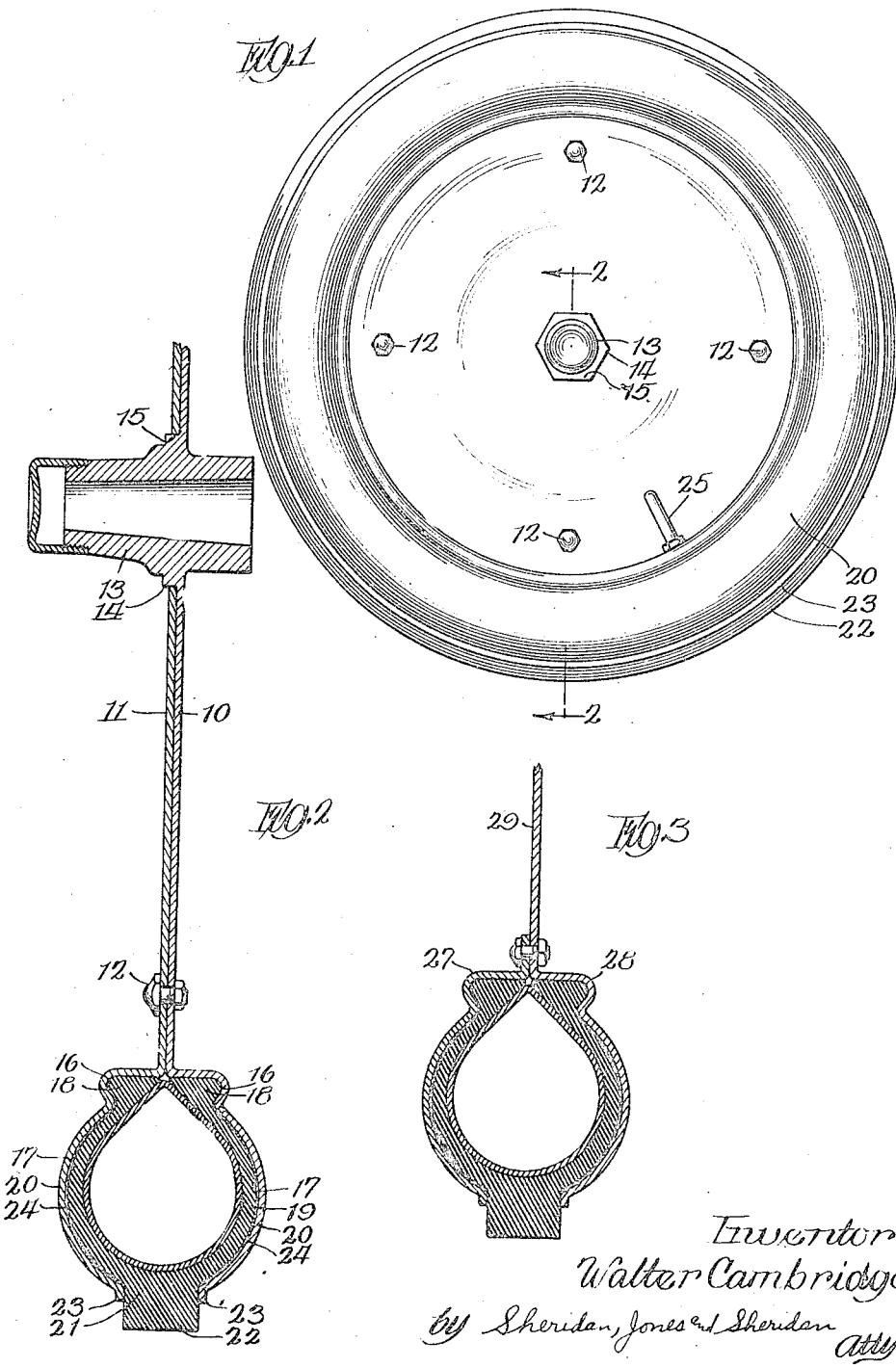

Patented Nov. 13, 1923.

1,473,810

UNITED STATES PATENT OFFICE.

WALTER CAMBRIDGE, OF BERWYN, ILLINOIS.

VEHICLE WHEEL.

Application filed September 3, 1923. Serial No. 661,602.

*To all whom it may concern:*

Be it known that I, WALTER CAMBRIDGE, a citizen of the United States, residing at Berwyn, in the county of Cook and State of Illinois, have invented certain new and useful Improvements in a Vehicle Wheel, of which the following is a specification.

This invention relates to improvements in vehicle wheels, and more particularly to those of the disc metal type.

One object of the invention is to provide a wheel of this character which shall be provided with means for protecting the tire casing against injury of all kinds, only the tread portion thereof being exposed.

Another object of the invention resides in the provision of a disc wheel so constructed as to greatly facilitate and simplify the mounting and demounting of the tire.

A further object is to provide a wheel of the class described which shall be strong and durable, simple in construction and assembly and economical to manufacture.

Many other objects and advantages will be apparent to those skilled in the art from a reading of the following specification taken in connection with the accompanying drawings wherein two forms of the invention are illustrated.

Stated briefly, the invention comprises two complemental disc members removably secured together to form a wheel, said members at their outer peripheries being so formed as to provide, when assembled, a casing of cross-sectional configuration closely approximating that of the tire; this casing completely housing said tire except for the tread portion thereof and thereby protecting it against injury.

In the drawings:

Figure 1 is a side elevation of a wheel constructed in accordance with the present invention, the tire being shown operatively mounted thereon.

Fig. 2 is an enlarged sectional view taken on line 2—2, Fig. 1, and

Fig. 3 is a sectional view similar to Fig. 2 showing a slightly modified construction.

Referring more in detail to the drawings, the wheel is shown as comprising two disc members 10 and 11 removably secured together by means of bolts 12, or in any other suitable manner. The disc 10 has formed as an integral part thereof or otherwise rigid therewith the hub member 13, the latter on one side of the disc 10 being provided with a radially extending projection 14 of hexagonal or other non-circular configuration. This projection 14, when the two discs are assembled, extends through a correspondingly shaped opening 15 in the disc 11. In this manner strain or shearing stresses on the bolts 12 are relieved, and, to a great extent, eliminated.

The discs 10 and 11 adjacent their outer peripheries are complementally grooved, as at 16 and 17, the grooves 16 in the assembled wheel forming the inner under-cut rim portion for receiving the usual beaded edges 18 of the tire 19. The grooves 17 produce the oppositely bulged radial flanges 20, which, in the assembled wheel, form a cylindrical like casing which extends completely around said wheel. The outer edges of flanges 20, however, terminate short of one another thereby providing a slot-like opening 21 around the extreme outer periphery of the wheel.

The tire 19 is of the pneumatic type, and as previously mentioned, is provided around its inner periphery with the usual beaded edges 18. In all other respects also the tire is of the usual construction except for the tread surface thereof which is provided with a raised tread portion 22 of substantially the same width as the slot-like opening 21; said tread portion extending through said opening when the wheel and tire are operatively assembled, as shown in Fig. 1 of the drawings. The flanges 20 at their outer peripheries terminate in straight extensions 23 which lie against the sides of the raised tread portion of the tire; these extensions serving as guides for the tread portion in its movements relative thereto as occasioned by the compression and expansion of the tire during its travel over the ground. These extensions also protect the portion of the tire where the tread portion 22 thereof joins the inner carcass of the casing and also prevents dirt, grit and other foreign substances from entering between the flanges and the casing.

It is further proposed to line the inner portions of the flanges 20 with asbestos 24 or other heat insulating material in order to protect the sides of the tire from direct contact with said flanges as the latter may in warm weather, for instance, become heated through exposure to the sun or in some other way to such degree as would otherwise cause injury to the tire. In order that heat developed in the tire resulting from intermittent compression and expansion thereof during travel may be radiated through the metal of the wheel, however, it is preferred not to insulate the inner bead receiving under-cut rim portion formed by the grooves 16.

In mounting or demounting the tire, it is merely necessary to remove the bolts 20 and separate the two discs 10 and 11. The advantages of this method of mounting and demounting the tire will readily suggest themselves to those skilled in the art.

There are many advantages attendant upon the construction of wheel herein described, chief among these being the complete protection against injury of all kinds, which is afforded the tire. As will be appreciated puncture of a tire in this construction can only occur by entry of the puncturing object through the raised tread portion of the tire casing intermediate the outer edges of flanges 20, and, obviously, this would be practically impossible due to the extra-ordinary thickness of the casing at this point. Punctures of the lateral type or those which occur by objects passing through the sides of the tire are entirely avoided.

The tire in the present construction is also protected against injury such as is frequently encountered as a result of travel through ruts, along track rails, against curb stones, and the like. Furthermore, it is possible to drive a vehicle equipped with these wheels even though one of the tires has become deflated without in any way injuring said tire, the wheel in such event rolling on the edges of the flanges 20 and the tire being pressed upwardly into the housing provided by said flanges.

The inflating valve of the tire is shown at 25, and extends through an opening in the base of the rim so as to be readily accessible adjacent the exposed face of the outer disc 11 of the wheel.

The flanges 20 covering and protecting the tire casing eliminate all wear thereon except at the tread surface, as previously described, and this being true, the casing may be used indefinitely through re-treading the same when wear has reduced the tread portion thereof to such extent as to render such step expedient.

In Fig. 3 of the drawings, a slightly modified form of construction is illustrated; this modification contemplating the use of only one disc 29 in the main body of the wheel and the provision of a removable rim section 27 complemental to the rim portion 28 of the disc 29. In this construction the removal of only this rim section 27 is necessary for mounting or demounting the tire. In all other respects the wheel shown in this figure of the drawings is substantially the same as that previously described.

In practice should the tire have a tendency to creep on the wheel some suitable provision may be made to counteract it. While the contacting portions of the discs 10 and 11 have been shown as of straight flat construction in the drawing, it will be obvious that said discs may be dished, corrugated, or otherwise formed to increase their strength and resiliency, if desired.

It will also be obvious that the improvements are susceptible of various other changes and modifications without departing from the spirit of the invention, and, accordingly, it is not desired to limit or restrict the same to the particular construction and arrangement of parts herein illustrated, except where limitations appear in the appended claims.

What I claim is:—

1. In a metal vehicle wheel, two discs secured together and having a hub member associated therewith, said discs being complementally grooved to provide an under cut rim for receiving the beaded edges of a pneumatic tire, and flanges curving outwardly from said rim and adapted to completely incase said tire except for its tread portion, and insulating material interposed between said flanges and said tire to protect the latter from overheating.

2. The combination with a pneumatic tire having a raised tread portion and the usual beaded edges, of a metal wheel comprised of two discs removably secured together and complementally grooved to provide an under cut rim for receiving said beaded edges, and curved flanges extending radially from said rim and completely incasing said tire except for the tread portion thereof.

3. The combination with a pneumatic tire having a raised tread portion and the usual beaded edges, of a metal wheel comprised of two discs removably secured together and complementally grooved to provide an under-cut rim for receiving said beaded edges, and curved flanges extending radially from said rim and completely incasing said tire except for the tread portion thereof, and insulating material interposed between said flanges and said tire.

4. The combination with a pneumatic tire having a raised tread portion and the usual beaded edges, of a metal wheel comprised of two discs removably secured together and complementally grooved to provide an under-cut rim for receiving said beaded edges, and curved flanges extending radially from said rim and completely incasing said tire except for the tread portion thereof, said flanges terminating in straight extensions engaging the sides of said tread.

5. A metal vehicle wheel comprising two discs removably secured together, and having means at their outer peripheries for forming a rim, a hub member carried by one of said discs and having a lateral projection of non-circular configuration intermediate its ends, and the other disc having a correspondingly shaped opening therein adapted to receive said projection when said discs are secured together.

6. The combination with a pneumatic tire having a raised tread portion, of a metal wheel for said tire, the latter having a rim formed of separable sections completely incasing said tire except for the tread portion thereof, and heat insulating material interposed between said rim and the sides of said tire to protect the latter from external heat and the inner periphery of said tire contacting directly with said rim to permit of radiation of internal heat.

In testimony whereof, I have subscribed my name.

WALTER CAMBRIDGE.